United States Patent [19]
Podkopaev et al.

[11] 3,780,450
[45] Dec. 25, 1973

[54] TEACHING MACHINE PREFERABLY FOR STUDYING FOREIGN LANGUAGES

[76] Inventors: Boris Ivanovich Podkopaev, Belomorskaya ulitsa, 22, korpus 3, kv. 19; Alexandr Vasilievich Bobkov, Tsvetochny kombinat, 14, kv. 2; Ljudmila Dmitrievna Chervyakova, 4 Grazhdanskaya ulitsa, 34, korpus 1, kv. 71, all of Moscow, U.S.S.R.

[22] Filed: June 5, 1972
[21] Appl. No.: 259,918

[52] U.S. Cl. .............................. 35/9 A, 35/35 D
[51] Int. Cl. ............................................ G09b 7/04
[58] Field of Search .................... 35/9 A, 9 B, 35 C

[56] References Cited
UNITED STATES PATENTS
3,292,276  12/1966  Hansel .................................. 35/9 B
3,210,864  10/1965  Tillotson .............................. 35/9 A Primary Examiner—Wm. H. Grieb
Attorney—Holman & Stern

[57] ABSTRACT

A teaching machine preferably for teaching foreign languages using a program containing a set of algorithmic exercises is provided with a detachable decoder having indication means intended to indicate the locations of correct answers on the program-carrier containing the program of algorithmic exercises.

2 Claims, 6 Drawing Figures

TEACHING MACHINE PREFERABLY FOR STUDYING FOREIGN LANGUAGES

BACKGROUND OF THE INVENTION

The present invention relates preferably to teaching machines, such as those for teaching foreign languages.

Teaching machines are known in which the answers should be subjected to intermediate numerical encoding prior to their introduction into the machine.

Known also in the art are teaching machines in which the correct answer to the question as recorded in the teaching program is to be chosen by the student out of a series of ready answers, with only one of them being correct. The other answers in the series are false and serve to camouflage the correct one.

Such machines can operate with various programs recorded on different program-carriers, e.g. film, punched cards, etc. Didactic possibilities of these machines can also be quite different. They can be designed as devices for teaching the multiplication table or as complex computers which teach complete courses of the various branches of science and technology. However, these machines are incompatible with the purpose of teaching a foreign language due to a number of their purely pedagogical drawbacks.

A answer introduced by the student into the teaching machine expressed in the form of a digital code is extracted from a chosen answer, which results in an artificial intermediate stage of the process of learning, the strong motivation to remember the instructional material being unjustifiably interrupted by the intermediate and alien process of numerical encoding which is out of harmony with the learning process. This intermediate stage is absolutely unjustified, since it prevents the student from perceiving the language material and from properly memorizing it. Moreover, he has to actively work with the unnecessary and false instructional material four times exceeding in quantities what the student has actually to remember.

The teaching machines in which the student selects the only correct answer out of a series of ready ones render the study process of a foreign language quite artificial. While selecting an answer, the student has to analyze a great amount of language material which is quite absurd, illogical and sometimes even meaningless altogether. Hence, the machine does not help the student in memorizing the correct language element since wrong answers become fixed in his mind and he may repeat them automatically while speaking. Besides, the compilation of study programs containing a great number of false answers camouflaging the correct ones makes the work of the preparer of the program rather difficult because the process of devising incorrect answers for the teaching program is more time-consuming than the compilation of the program itself.

Also known is a teaching machine intended preferably for teaching foreign languages which comprises a task setting unit having a set of algorithmic exercises to be successively carried out and connected to a control unit, a signalling unit, a memory and an answer unit, while the task setting contains a reference unit and the signalling unit contains an estimation unit. The student using this machine and faced with a teaching program of algorithmic excercises would manipulate commutation means of the answer unit to feed the machine with the answers to the question of every excercise. According to the result of the estimation of the answer the student would either pass over to the next excercise or would be given a consultation on the problem at hand. The answer codes are stored in the memory of the machine while the program of algorithmic excercises is recorded on a paper program-carrier and the student has to choose the correct answer to every exercise. Every answer corresponds to a definite excercise and to a definite inner code stored in the memory of the machine. It is evident that these inner codes are inaccessible to the student. As a matter of fact they are inaccessible to the preparer of the program, also. The last feature of the machine constitutes one of its drawbacks, since to place the correct answer in accordance with the code in the memory the programmer has to check all inner codes and hence, spends an extensive period of time to compile programs of algorithmic excercises for the teaching machine. Besides, the adjustment procedure of the machine when the code in the memory becomes damaged is also rather labor-consuming.

SUMMARY OF THE INVENTION

The object of the preset invention is to provide a teaching machine preferably for teaching foreign languages in which the procedure of finding the location of the correct answer on the program-carrier becomes as easy as possible for the programmer so as to enable him to quickly compile various programs pertaining to different topics.

This object is achieved by designing a teaching machine preferably for teaching foreign languages, comprising: a task setting unit intended to exhibit to view in the machine a program comprising a set of algorithmic excercises to be successively worked out and which contains a memory for storing the inner codes of answers to the questions as stated in the program of algorithmic excercises and a program-panel for holding a program-carrier having the algorithmic exercises stored thereon; an answer unit having manually operable keys to provide the machine with answers to the questions to be found in the program comprising a set of algorithmic excercises and having its input connected to the memory; an estimation unit determining whether the introduced answer is correct and having one of its inputs connected to the task unit and the other input connected to the answer unit; a reference unit providing the student, in case the latter has given an incorrect answer, with the correct one or with respective reference data for the same question as found in the program of algorithmic excercises; a decoder having indicating means to show the locations of correct answers on the program-carrier the indication means being disposed in opposition to the manually operable keys of the answer unit; a control unit adapted to prepare the machine for operation, to preset the required mode of operation and ensuring transfer to a completion of a successive excercise in the program of exercises, in case the student has given correct answers to the questions of every exercise or ensuring that it generates a signal to the reference unit in case the answer is incorrect; one output of the control unit being connected to the task unit, the second output being connected to the reference unit and the input being connected to the estimation unit, which, according to the invention, is provided with a decoder having means for indication the location of correct answers on the program-carrier the indicating means being disposed in opposition to the manually operable keys of the answer unit.

It is preferable that this decoder is made as a detachable plug-in device with pins and indicating means the number of which is equal to the manually operable keys in the answer unit, the pins electrically connecting the contacts of the indicating means to the memory which correspond to the locations of correct answers on the program-carrier the indicating means being disposed in opposition to the manually operable commutation keys.

The present teaching machine comprises a housing made as a desk for the individual use of a single student. A flap cover and locks convert the desk into a semi-isolated booth where the student responds on the machine under the guidance of the instructor taking advantage of the individual study process to step-up his progress to the highest possible degree. Programmed instruction in this case becomes a highly productive and intensive aspect of the traditional process of learning, an element of the system based on the "instructor-teaching machine-student" relationships. The pace for the students to work in the "instructor-teaching machine-student" system is set up by the instructor from a remote control panel depending on the general level of knowledge characteristic of the given group of students. At the same time the teaching machine operates in a semiautomatic mode within the traditional framework of a lesson. The students who are more intelligent or better trained than others would fulfil the tasks more quickly, i.e. they would spend less time responding to the machines. Thus, without breaking out of the framework of the lesson, they would be able to use the advantages of the machine by operating it in the automatic mode as the "teaching machine-student" system with the help of supplementary programs. Besides, the student can use the teaching machine for extra training and self-check outside the framework of the lesson. Thus, the instructor can make students respond on the machine in various ways.

The flap cover of the machine housing also permits the rational use of the classroom equipped with various devices for studying foreign languages as an ordinary one with standard desks after the intensive pre-oral machine practice is over. The instructor loses no time in passing over to the traditional oral practice on the basis of the excercises that his students have just carried out with the help of the teaching machines. To do this the students have to unlock the flap covers and fold them converting the teaching machines into work desks. Thus, the instructor is enabled to conduct the lesson in the traditional way with no individual booths in front of him which otherwise would make it impossible for him to contact personally those students who lag behind in their studies. The flap covers, therefore, allow the instructor to conduct the lesson in one and the same classroom in two ways: traditionally and with the direct use of teaching machines when two adjacent machines with flap covers form a booth. Besides, there is no excess noise, no bustle, no time losses while the students leave the language laboratory containing booths to get into an ordinary classroom with work desks. Moreover, it becomes possible to more efficiently use the classroom facilities and the classroom itself.

In addition to specially prepared instructional materials the machine training can be organized on the basis of excercises from ordinary text-books for any stage of studying a foreign language. Thus, the applications of the teaching machine can be quite broad. The efficiency of the machine increases with the number of students in a class. The machine is quite effective for intensive pre-speaking training as well as in the course of seminars on all theoretical aspects of the language, since the answers that the students give to the machine are formatted in language elements omitting unnecessary and alien intermediate numerical encoding of that language element which in turn facilitates their mastering of the instructional material.

The term "language elements" is used here to denote all words and word combinations, all formal parts of the word-morphemes, all analytical or synthetical grammatic forms and grammatic means, all figures of speech and marked parts of a pronouncement (syntagmes), as well as various formalized and logical language signs. Answers can also be introduced into the machine in the form of graphs and drawings and pictures emitting intermediate numerical encoding prior to responding on the machine.

After sufficient training in the use of teaching machines students can feed the machine with an answer every 22 seconds, i.e. 40–45 answers in 15 minutes. Advanced students are known to introduce from 50 to 60 answers in 15 minutes and even more.

The above and other objects and advantages of the present invention will be better understood by those skilled in the art from the description of an embodiment given by way of example with reference to the accompanying drawings, in which

DETAILED DESCRIPTION OF A PREFERRED EMBODIMENT

Figure 1:
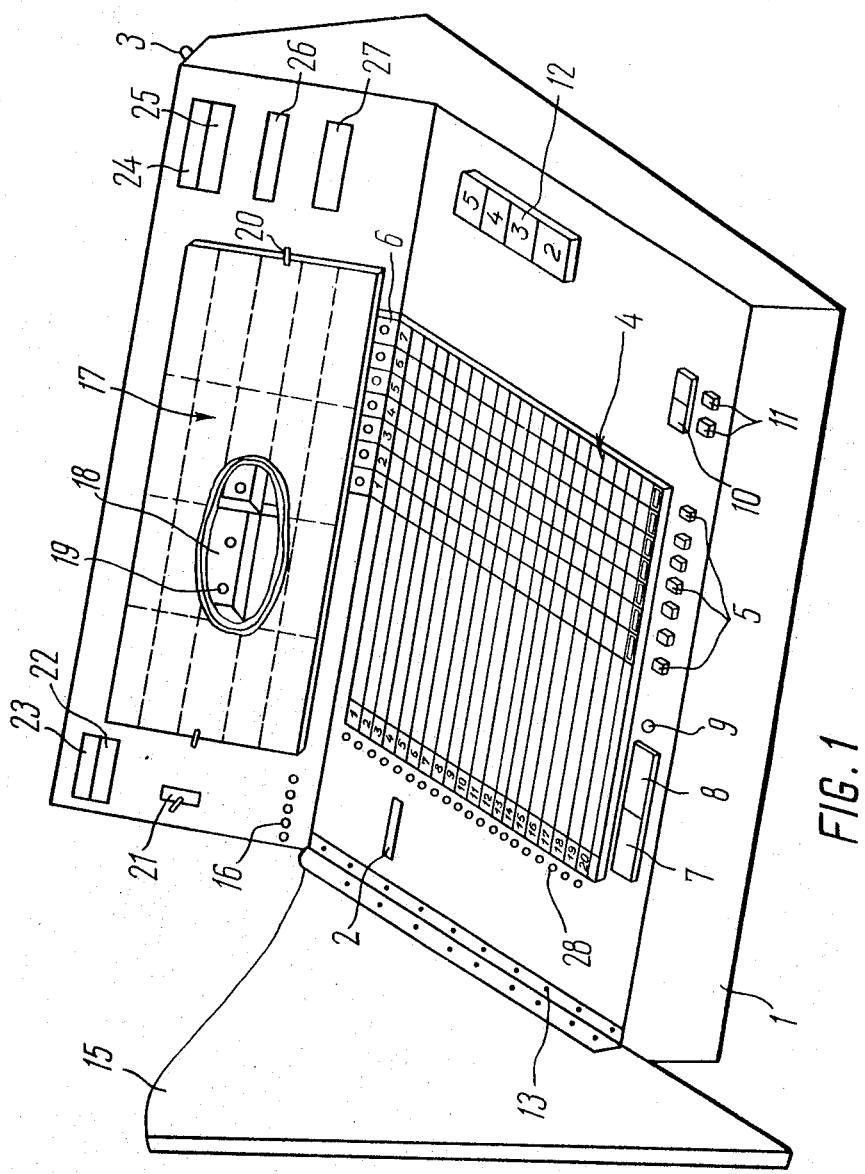
FIG. 1 presents a general perspective view of the teaching machine, according to the invention, with the cover in the open position showing manually operable keys and some switches and reference device and display windows.

All examples in the drawings are in English, but it is evident that the present teaching machine can be used to study any foreign language.

The teaching machine (FIG.1) comprises a housing 1 provided with a slot 2 for a page of the examination record to print the mark the student gets for the excercise he does in the "examination" mode. The printout mechanism (not shown in the drawing) is mounted inside the housing. The rear wall of the housing is interlocked with the help of end switches (not shown in the drawing). There is also a light 3 which starts blinking as soon as the rear wall becomes unlocked.

The light 3 is connected to a buzz or a bell (not shown in the drawing) located inside the housing of the machine and intended to produce an audio warning signal in case the machine is unlocked and in case an improper attempt is made to observe the correct answers or find the number of the code matrix of the machine for the given program. The interlock system is provided with a switch (not shown in the drawing) located above an interlocked cover. Additionally, if in the "examination" mode somebody tries to cheat, the same interlock system will immediately print out a bad mark.

Mounted on the front horizontal surface of the housing 1 is a programm panel 4 which holds the teaching program. Located in front of the program-panel is a row of main manually operable keys 5 for answer input. Adjacent to the programm-panel from above is a detachable decoder 6 intended to decode and display the correct answer. The front horizontal surface of the housing carries also: signalling system for the "training" mode (correct indicator 7 and "incorrect" indicator 8); a semiautomatic mode start light 9,; a supplementary programframe 10 for two language elements to be used in the semiautomatic mode of operation; supplementary manually operable keys 11 for answer input only in the semi-automatic mode; a visual display 12 to show marks in the 5-degree scale in the automatic "examination" mode; hinges 13 and locks 14 (FIG.2) to secure a flap cover 15 in the vertical position.

Figure 3:
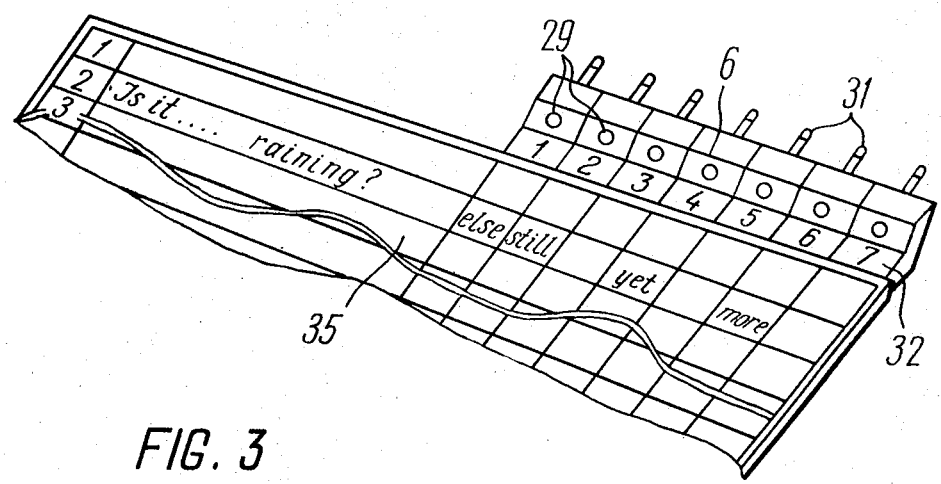
FIG. 3 is a perspective view of the exterior of the detachable decoder with a part of the program-panel.

The front vertical surface of the housing 1 of the teaching machine carries lights 16 indicating the number of programs; a reference unit 17 designed as a display panel divided into twenty cells 18 each of which is provided with two panel illumination lamps 19. The panel of the reference unit 17 is covered with two glass plates (not shown in the drawing) having between them a sheet of paper the size of which corresponds to that of the panel carrying reference data (a theoretical explanation or just a prompt). In case the student gives an incorrect answer the respective cell 18 of the reference unit will become illuminated explaining to him the mistake he had made while fulfilling the teaching program recorded on the program panel 4. The glass plates on the panel of unit 17 are secured with the help of detents 20 provided with end switches (not shown in the drawing) which are located within the housing 1 of the machine. The front vertical surface of the housing 1 of the machine carries also a program reset switch 21; a semiautomatic mode indicator 22; an automatic mode indicator 23; an "examination" mode indicator 24; a "training" mode indicator 25; a "start" indicator 26 and a "finish" indicator 27. Located to the left of the program panel 4 are lights 28 showing the numbers of excercises in the teaching program while the detachable decoder 6 is provided with lights 29 see FIG. 3, for indicating the locations of correct answers to the questions of teaching program excercises, every correct answer and the corresponding manually operable input keys 5 being arranged along the same vertical line.

Figure 2:
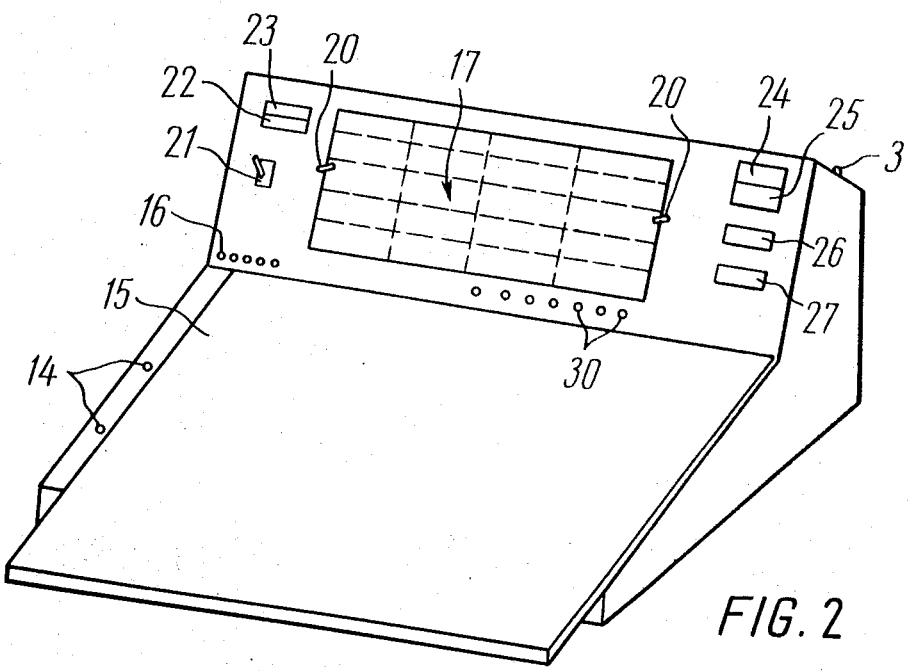
FIG. 2 presents a general perspective view of the exterior of the teaching machine

The front vertical surface of the housing 1 of the teaching machine is provided with contact jacks 30 (FIG.2). These jacks 30 serve to receive pins 31 (FIG.3) of the detachable decoder (6). The decoder 6 has a plate 32 bearing the numbers of the manually operable input keys 5.

Figure 4:
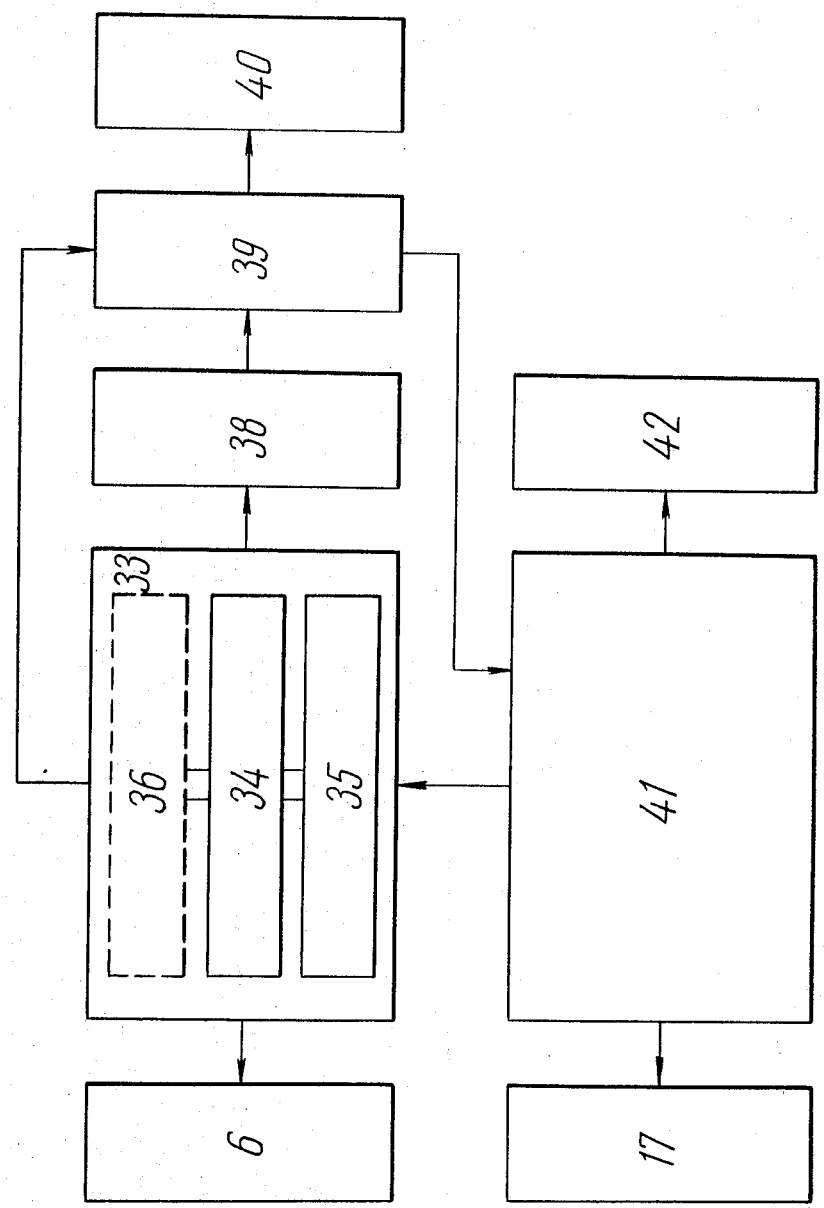
FIG. 4 is a block diagram of the teaching machine.

The principal electrical units of the teaching machine are mounted inside its housing 1. A task unit 33 (FIG.4) serves to exhibit the program of algorithmic excercises to be successively carried out by the student and has one of its outputs connected to the detachable decoder 6. The task unit 33 comprises: a memory 34 which stores the inner codes of answers to the questions in the program of algorithmic exercises; the program panel 4 (FIG.1) with a program-carrier 35 (FIG's 3 and 4); a remote control panel 36 used when the machine operates in the semi-automatic mode and located on the instructor's control console. The memory 34 uses step-by-step selectors.

Figure 6:
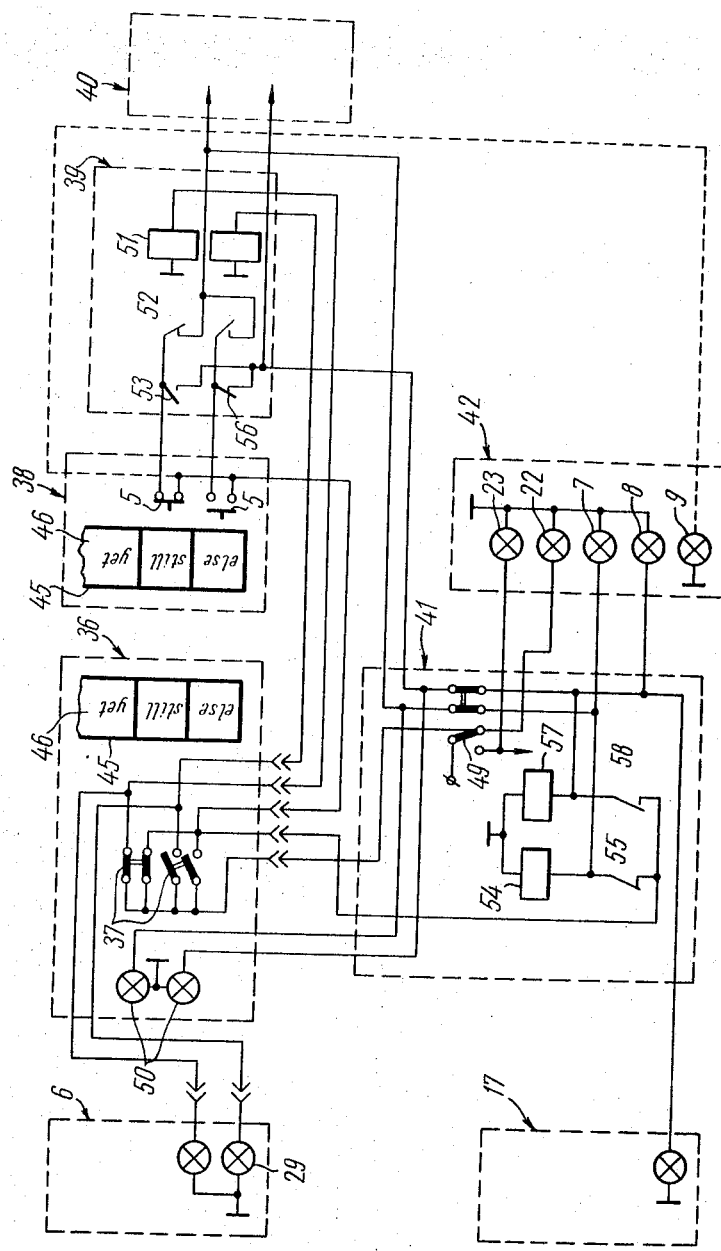
FIG. 6 is a schematic electrical diagram of the teaching machine in the semi-automatic mode of operation.

The remote control panel 36 uses switches 37 (FIG.6). The answer unit 38 is connected to the second output of the task unit 33. It comprises the main manually operable keys 5 for answer input, two supplementary buttons 11 for answer input and a supplementary program frame 10 for two language elements respectively. The answer unit 38 serves to feed the machine with answers to the questions to be found in the program of algorithmic exercises, the answers being worded in natural language elements. An extimation unit 39 uses a group of relays and is connected to the output of the answer unit 38 and to the third output of the task unit 33. The estimation unit 39 serves to determine whether the answer introduced by the student with the use of keys 5 and 11 to the question of the teaching program is correct. Connected to the output of the estimation unit 39 is a print out mechanism 40 to print the marks in the examination record of the student. The control unit 41 uses relay groups and switches and serves to prepare the machine for operation, to set in the modes of operation in case the answer given by the student to the question of the teaching program is correct, ensures that the machine passes over to the next number of the set of algorithmic exercises. In case the answer is incorrect one output of the control unit 41 will produce a signal which will be fed to the reference unit 17 to make the latter display the required data. The second output of the control unit 41 is connected to the task unit 33, its input is connected to the estimation unit 39 while the third output of the control unit 41 is connected to a signalling unit 42 which serves to display the marks received by the student in the "examination" mode, indicates whether the answer introduced by the student in the "training" mode is correct or wrong, and monitors the mode of machine operation.

The program-panel 4 (FIG.5) comprises a rectangular holder 43 serving to accommodate the program-carrier 35 which is a sheet of hard paper. Ruled on the sheet are lines the number of which is equal to that of the set of algorithmic exercises. The left-hand section of the sheet is occupied with twenty excercises written on the lines. Every excercise contains a task for the student. The right-hand section of the program-carrier is ruled also with vertical lines forming seven columns in accordance with the number of answer versions. Every line of every column contains a language element 44. The language elements that correspond to correct answers are placed in accordance with the inner codes of the memory 34 in the columns of the respective main manually operable keys 5 for answer input. Additionally, at the bottom of the program holder 43 is a frame 45 with a renewable panel 46 carrying seven language elements 44. The frame 45 with the renewable panel 46 is placed in the immediate vicinity of the main manually operable keys 5 for answer input so that every button 5 is located opposite to the respective language element 44 (correct answer). For ease of operation the program-carrier 35 is pressed down with a detachable cover 47 made of a transparent material. In its lower right-hand corner the cover 47 has a cut-out the size of which corresponds to that of the frame 45. To increase the flexibility of the machine operation in the semi-automatic mode the supplementary program-frame 10 is also provided with a renewable panel 48 carrying two supplementary language elements 44.

The programmed instructional material for the teaching machine recorded on the program-carrier 35 and the required explanations and reference data on the sheet of paper in the reference unit 17 are based on the so-called algorithmic language training excercises to be found in all text-books of foreign languages such as: open the brackets and use the correct grammatical form; select the proper synonym or antonym and put it instead of the dash; use the correct case, word, article, proposition, conjunction, pronoun; determine what part of speech or part of the sentence is the word underlined in the sentence; show the place of the adverb, adjective in the sentence; indicate what part of the sentence is the underlined word and by what this part of the sentence's expressed, etc. Additionally, the machine can be used to check the translation from one language into another using the rigid algorithm method based on sequence selection of marked parts (syntagmes) of a translated sentence. The same method can also be used to do the so-called transformation excercise in which a change of the person requires respective changes in the grammatical forms of other parts of the sentence. All these excercises, although they demand unambiguous answers and require simple operations, are characterized by their capacity and flexibility and prove to be a universal logical form of intensive and effective training of students mastering the instructional material of any complexity, at any level and in any language. The teaching machine makes it possible to select the correct answer within the range from one out of two to one out of nine language elements.

While compiling a program for the machine the teacher plans the systematic order of studies and the degree to which the students should master this or that grammatical or lexical material. In doing so the instructor takes into account both the age of his students and the amount of their previously acquired knowledge. A program for the teaching machine comprises a number of components. An example of such a program in an abridged form can be described as follows.

The first component of the teaching program pertains to the content of the renewable panels 46 and 48 and of the right-hand section of the program-carrier 35. This content in effect is the title of the program and the task for the student as well. For instance, put the words "yet," "still," "more" and "else," in the following sentences in place of dashes and translate some sentences from one language into another. The words "yet," "still," "more" and "else" form the content of the renewable panels or of the right-hand section of the program-carrier.

The second component of the teaching progarm pertains to the left-hand section of the program-carrier 35 which contains twenty sentence-exercises on the use of the words "yet," "still," "more" and "else" including a number of sentences to be translated from Russian into English.

EXAMPLE

1. Is it - raining?
2. ..................
3. ..................
4. ..................
5. ..................
6. ..................
7. Он еще не закончил свои завтрак?
8. У Вас есть еще какие-нибудь вопросы
9. Он еще не пришел, etc.

Lines seven, eight and nine in the right-hand section of the program-carrier 35 for the translation exercises will be occupied with English words or syntagmes. Thus, for the exercise on line number seven such words will be located in seven columns of line seven as follows:
1. yet?; 2. still; 3. hasn't he finished; 4. else; 5. doesn't; 6. lunch; 7. his.

Having written his version of the translation on a control card, the student starts introducing the translation into the machine by successively depressing the keys 5. For the above given excercise the keys have to be depressed in the following succession: 3. Hasn't he finished; 7. his; 6. lunch; 1. yet? The same succession is used in the inner code recorded in the memory 34. The program preparer, while compiling the program of algorithmic excercises and recording it on the program-carrier 35 should follow the same succession in arranging language elements in the columns of the right-hand section of the program-carrier 35. As it has been pointed out above this procedure used to be rather time-consuming. The detachable decoder 6 provided in the present teaching machine facilitates the program compilation procedure. Using the lights 29 the detachable decoder will show the preparer of the program the column and the line where he should place the correct answer, i.e. the required language elements 44.

The third component of the teaching program pertains to reference data arranged in twenty cells 18 of the reference unit 17.

Figure 5:
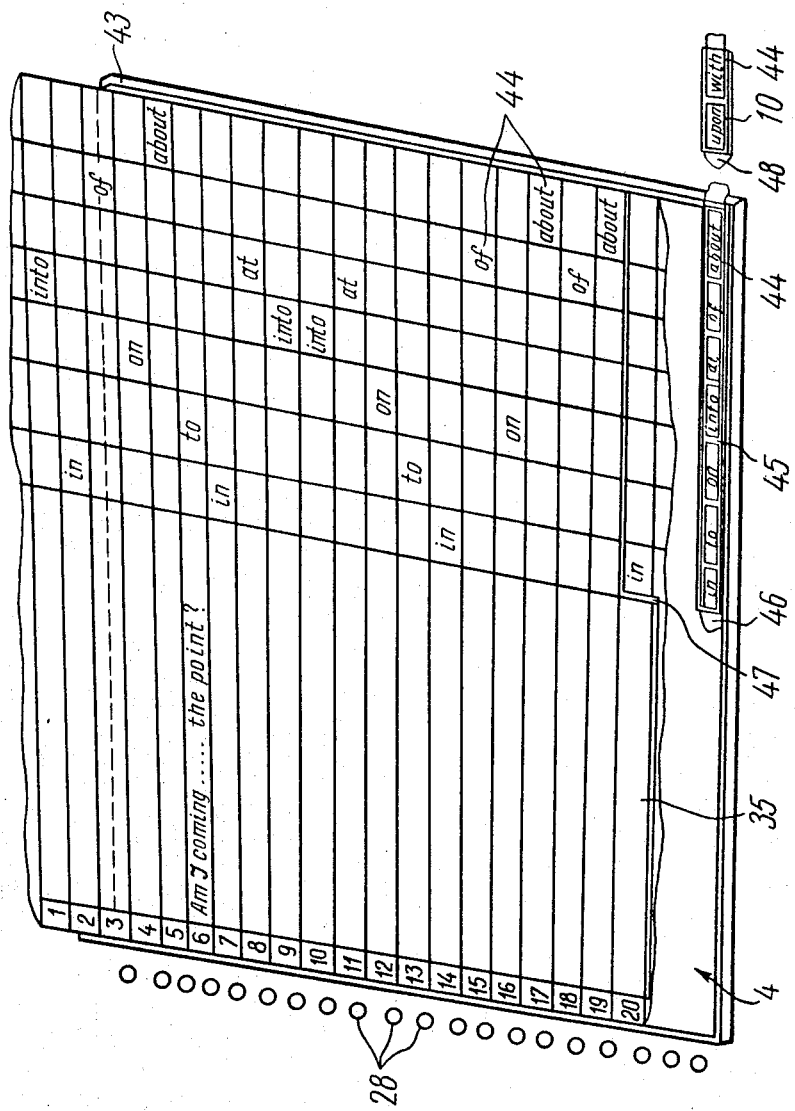
FIG. 5 is a perspective view of the program panel with the program-carrier of the teaching machine showing the location of the language elements and the teaching program.

The invention can be best understood by reference to the following description of the principle of operation of the herein disclosed teaching machine in the semi-automatic mode given with reference to FIG.6. The control panel 36 is provided with a switch 37 and lights 50. Located also on the control panel 36 is a frame 45 which is identical to that located at the bottom of the holder 43 (FIG.5). The frame 45 houses a panel 46 carrying language elements 44. Every language element has a separate switch 37 and two separate lights 50 indicate correct or incorrect answers to the instructor. The drawing shows only two switches 37 out of nine and two lights 29 out of seven. The supplementary frame 10 is used only when operating in the semi-automatic mode.

To start operating the machine in the semi-automatic mode the laboratory assistent energizes the machine by connecting it to the mains and operates the tumbler switch 49 located on the rear wall of the body to the respective position. The "semi-automatic" indicator 22 starts glowing. The task set before the student consists in answering the questions of excercises from a programmed textbook or from the program carrier having a set of algorithmic exercises recorded thereon. The time interval during which the student should fulfil the task of every excercise is adjusted by the instructor whose duty is to organize intensive and effective training at an accelerated pace. The start of the answer is indicated by the light 9 and by an audio signal which draws the attention of the students to the next answer. The instructor operates the appropriate switch of the switches 37 which energizes the light 9 "Start," relay 51 operates, contact 52 closes and contact 53 opens. The estimation unit 39 is ready to receive the answer through the key 5 of the answer unit 38. When the student presses the button 5 which corresponds to the correct answer, i.e. the botton which is located opposite to the correct answer on the renewable panel 46, a relay 54 will operate through the closed contact 52. This closes a contact 55 which connects the relay 54 to the interlocking system. Simultaneously with the operation of the relay 54 the "correct" indicator 7 starts glowing on the signalization unit 42 and the correct light 50 is energized on the control panel 36 informing the instructor that his particular student has given the correct answer. The circuit will remain in this state until the position of the switch 37 is reset. Then, another or the same switch of switches 37 is operated and the total cycle is repeated to fulfil the task of the next excercise. In case the student depresses a key 5 or key 11 which does not correspond to the correct answer a relay 57 will operate through a closed contact 56. This will close a contact 58 which will connect the relay to the interlocking system. Simultaneously with the operation of the relay 57 the "incorrect" indicator 8 and 50 starts glowing and the respective cell 18 of the reference unit 17 becomes illuminated.

In both automatic modes the teaching program is on the program-carrier 35 the program being compiled with the use of the detachable decoder 6 in accordance with the inner codes stored in the memory 34. In both automatic modes the memory 34 performs the functions of the control panel 36. The only difference consisting in that instead of the switch 37 which is to be operated by the instructor himself, the memory 34 uses step-by-step selectors for the same purpose and makes it possible to pass over to the next number of the program or automatically reset at initial position 28.

A student or laboratory assistant inserts the program-carrier 35 in the panel 4, energizes the machine and operates the switch 49 on the rear wall of the housing 1 to the required position of "training." The "automatic mode" indicator 23 and the "training" indicator 25 start glowing. The initial position is reset by the manually operable reset switch 21 and the "start" indicator begins to glow. The control panel 41 turns on a light 28 corresponding to excercise number one. The student responds by depressing a key 5. In case he depresses the "correct" key the "correct" indicator starts glowing and a light 28 of the next number of the program turns on. In case the answer is incorrect the "incorrect" indicator 8 starts glowing and the respective cell 18 of the reference unit 17 becomes illuminated. Having read the reference data, the student gives the correct answer, and the while cycle is repeated until all the numbers in the program are covered, which is followed by the turn-on of the next light 16 showing the quantity of programs every program set consisting of twenty numbers and each time the control unit 41 restores the machine to the initial positions of starting after all the exercises of the program have been carried out.

The succession of operations in the "examination" mode is similar to that in the "training" mode. But turned on in this case are the "examination" indicator 24 and the examination marks display 12. The latter presents an "excellent" mark ("5"). In case the student makes a mistake, i.e. introduces an incorrect answer into the machine, a signal from the memory 34 will make the display 12 show another mark which is one degree lower ("4"), etc. When the mark goes down to "bad" ("2") the control unit 41 will automatically switch the machine over from the "examination" mode to the "training" mode, while the printout mechanism 40 will fix this bad mark in the examination record of the student.

While the preset invention has been described above in connection with its preferred embodiment, those skilled in the art will easily understand that there can exist modifications and forms thereof without departing from the concept and scope of the claims.

What we claim is:

1. A teaching machine for teaching students, preferably foreign languages, comprising:

task unit means for presetting in the machine a program of sequenced algorithmic exercises, said task unit means having a memory means for storing coded answers to said exercises, and a program panel means for holding a program carrier having said program recorded thereon;

answer unit means having an input and an output, said input being connected to said memory means said answer unit means having a set of operable keys which when depressed by a student supplies said machine with said answers;

estimation unit means for determining whether said supplied answers are correct, said estimation unit means having two inputs one of which is connected to said task unit means, the other connected to said answer unit means;

reference means for providing a correct answer to a student assuming the answer provided by the student to a question in said program is incorrect and providing reference data corresponding to said question and to every question in said program of sequenced algorithmic exercises;

decoder means connected to said task unit means and having indicating means for indicating the locations of correct answers on said program carrier;

control means for presetting a required mode of operation of said machine, said control means having two outputs and an input, one of said outputs being connected to said task unit means, the other to said reference means, said input being connected to said estimation unit means, said control means ensuring continued operation of said machine to a subsequent exercise of said program of sequenced algorithmic exercises when the student has supplied correct answers to preceding exercises in said program and operatively addressing said reference means when said answers are incorrect.

2. A teaching machine as claimed in claim 1, in which said decoder means is operatively designed as a plug-in unit having pins and said indicator means the number of which is equal to that of the number of keys in said set of operable keys in said answer unit means, said pins electrically connecting said indicator means to contacts of said memory means which correspond to locations of correct answers on said program carrier.

* * * * *